US008516243B2

(12) United States Patent
Jokela et al.

(10) Patent No.: US 8,516,243 B2
(45) Date of Patent: *Aug. 20, 2013

(54) HOST IDENTITY PROTOCOL METHOD AND APPARATUS

(75) Inventors: Petri Jokela, Espoo (FI); Jan Melén, Espoo (FI)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 1549 days.

This patent is subject to a terminal disclaimer.

(21) Appl. No.: 11/816,459

(22) PCT Filed: Nov. 17, 2005

(86) PCT No.: PCT/SE2005/001730
§ 371 (c)(1),
(2), (4) Date: Aug. 16, 2007

(87) PCT Pub. No.: WO2006/088403
PCT Pub. Date: Aug. 24, 2006

(65) Prior Publication Data
US 2008/0271132 A1   Oct. 30, 2008

(30) Foreign Application Priority Data
Feb. 18, 2005   (GB) .................................. 0503416.0

(51) Int. Cl.
*H04L 9/32* (2006.01)
*H04L 29/06* (2006.01)

(52) U.S. Cl.
USPC .............. 713/153; 713/156; 713/168; 726/10

(58) Field of Classification Search
None
See application file for complete search history.

(56) References Cited

U.S. PATENT DOCUMENTS

| | | | | |
|---|---|---|---|---|
| 6,061,346 A * | 5/2000 | Nordman | ....................... | 370/352 |
| 6,353,891 B1 * | 3/2002 | Borella et al. | .................. | 726/12 |
| 6,982,967 B1 * | 1/2006 | Leung | ........................... | 370/328 |
| 7,213,263 B2 * | 5/2007 | Makineni et al. | ............... | 726/11 |
| 7,346,771 B2 * | 3/2008 | Narayanan | .................... | 713/153 |
| 7,401,216 B2 * | 7/2008 | Arkko et al. | .................. | 713/153 |
| 7,735,126 B2 * | 6/2010 | Zhang et al. | .................... | 726/10 |
| 2002/0133534 A1 * | 9/2002 | Forslow | ....................... | 709/200 |
| 2006/0245362 A1 * | 11/2006 | Choyi | ........................... | 370/238 |
| 2007/0274312 A1 * | 11/2007 | Salmela et al. | ............... | 370/392 |

OTHER PUBLICATIONS

Miika Komu, Application Programming Interfaces for the Host Identity Protocol, Sep. 13, 2004, pp. 1-86, Department of Computer Science and Engineering, T-110.*
Patrik Salmela, Host Identity Protocol Proxy in a 3G system , !Feb. 1, 2005, pp. 1-101, Helsinki University of Technology Dpartment of Electrical and Communications Engineering, T-110.*
Nikander et al < Identifier/Locator Split and DHTS, Proceedings of the research Seminar on Telecommunications Software , pp. 1-112, ESpp 2005, TML_C17.*

* cited by examiner

*Primary Examiner* — David Garcia Cervetti
*Assistant Examiner* — Fatoumata Traore

(57) ABSTRACT

A method and apparatus of at least partially securing communications between first and second hosts using the Host Identity Protocol (HIP) is provided. The first host is not HIP enabled and the second host is HIP enabled. A persistent HIP identity is associated with the first host and maintained at a remote server. A public part of the persistent HIP identity is obtained from the remote server together with a certificate authorizing a gateway node between the first and second hosts to use a temporary HIP identity associated with the first host. A secure HIP identity is negotiated between the gateway node and the second host using at least part of each of the persistent HIP identity, the temporary HIP identity, and the certificate.

33 Claims, 11 Drawing Sheets

FIG. 2
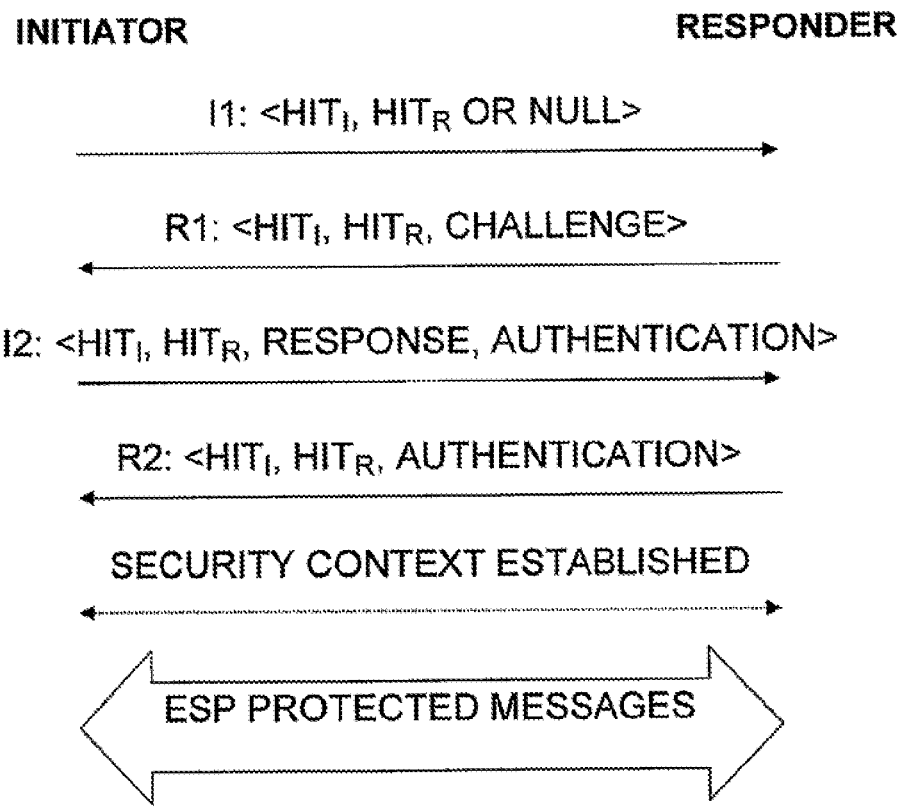
FIG. 3
LOGICAL NEW PACKET STRUCTURE
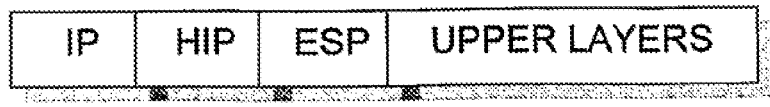
ACTUAL PACKET STRUCTURE
AFTER THE HIP NEGOTIATION
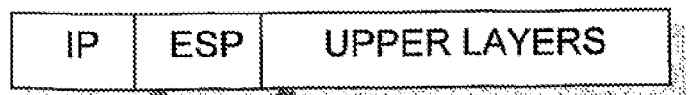

FIG. 11

Step T3 message headers:

| HIP header | | IP header |
|---|---|---|
| N/A | N/A | SOURCE: $HIT_{MS(GGSN)}$ | DESTINATION: $HIT_{HH}$ |

Step T4 (I1) message headers:

| HIP header | | IP header |
|---|---|---|
| INITIATOR: $HIT_{MS(GGSN)}$ | RESPONDER: $HIT_{HH}$ | SOURCE: $IP_{GGSN}$ | DESTINATION: $IP_{HH}$ |

Step T4 (R1) message headers:

| HIP header | | IP header |
|---|---|---|
| INITIATOR: $HIT_{MS(GGSN)}$ | RESPONDER: $HIT_{HH}$ | SOURCE: $IP_{HH}$ | DESTINATION: $IP_{GGSN}$ |

HOST IDENTITY PROTOCOL METHOD AND APPARATUS

BACKGROUND OF THE INVENTION

1. Field of the Invention

The present invention relates to a method of using the Host Identity Protocol (HIP) to at least partially secure communications between two hosts, one of the two hosts being HIP enabled and the other not.

2. Description of the Related Art

When the Internet was originally devised, hosts were fixed in location and there was implicit trust between users despite the lack of real security or host identification protocols, and this situation continued even upon wider uptake and use of the technology. There was little need to consider techniques for dealing with host mobility since computers were relatively bulky and immobile.

With the revolution in telecommunications and computer industry in the early 1990's, smaller communication equipment and computers became more widely available and the invention of the World Wide Web, and all the services that emerged with it, finally made the Internet attractive for the average person. The combination of increasing usage of the network and mobile telecommunications created the need for secure mobility management in the Internet.

The increasing number of involved parties, and the monetary transactions that were needed for certain services, also created a need for added application level security. Currently, the most widely used encryption protocols, for example SSL/TLS, are running within the upper network layers, for example TCP.

Taking into account the above mobility management and security issues, the Mobile IP standard (C. Perkins, "IP Mobility Support for IPv4", RFC 3220, IETF, 2002) and the Mobile IPv6 standard (D. Johnson, C. Perkins, J. Arkko, "Mobility Support in IPv6", RFC3775, IETF, 2004) have been introduced. Together these specifications are planned to provide mobility support for the next generation Internet. Security work is developing in the form of IPsec, and related activities, such as various key exchange protocols, with the aim being to provide security in the IP layer. However, experience has shown that it is fairly hard to reach combined security and mobility using the current standards.

An IP address describes a topological location of a node in the network. The IP address is used to route the packet from the source node to the destination. At the same time the IP address is also used to identify the node, providing two different functions in one entity. This is akin to a person responding with their home address when asked who they are. When mobility is also considered, the situation becomes even more complicated: since IP addresses act as host identifiers in this scheme, they must not be changed; however, since IP addresses also describe topological locations, they must necessarily change when a host changes its location in the network. Clearly, it is impossible to achieve both stability and dynamic changes at the same time.

In the case of Mobile IP, the solution is to use a fixed home location providing a "home address" for the node. The home address both identifies the node and provides a stable location for it when it is at home. The current location information is available in the form of a care-of address, which is used for routing purposes when the node is away from home.

Another solution to the problem is to separate the identification and location functions from each other, and this is the approach taken in the Host Identity Protocol (HIP) proposal (R. Moskowitz, P. Nikander, P. Jokela, "Host Identity Protocol", Internet Draft, work in progress, draft-ietf-hip-base-01, IETF, 2004). HIP separates the location and identity roles of IP addresses by introducing a new name-space, the Host Identity (HI). In HIP, the Host Identity is basically a public cryptographic key of a public-private key-pair, and is generated from and linked to the private key. The public key identifies the party that holds the only copy of the private key. A host possessing the private key of the key-pair can directly prove that it "owns" the public key that is used to identify it in the network. The separation also provides a means to handle mobility and multi-homing in a secure way.

HIP is discussed in more detail below, but is not the only proposal based around the idea of location and identity separation. FARA (D. Clark, R. Braden, A. Falk, V. Pingali, "FARA: Reorganizing the Addressing Architecture". ACM SIGCOMM 2003 Workshops, Aug. 25 & 27, 2003) is a generalized model of ideas that provides a framework from which the actual architecture can be derived. FARA could make use of the HIP when the node identifications are verified, and consequently HIP could be a part of a particular FARA instantiation. The PeerNet proposal (J. Eriksson, M. Faloutsos, S. Krishnamurthy, "PeerNet: Pushing Peer-to-Peer Down the Stack", IPTPS '03, Feb. 20-21, 2003) also discusses the location and identity separation. The Internet Indirection Infrastructure, I3 (I. Stoica, et. al., "Internet Indirection Infrastructure", ACM SIGCOMM '02, Aug. 19-23, 2002) also defines a separation between the identity and routing information.

The Host Identity Protocol introduces a separation between the location and identity information at the IP layer. In addition to the separation, a protocol is defined to negotiate security associations (SAs) between HIP-enabled nodes.

With HIP, each host has one or more identities, which can be long-term or short-term, that can be used to identify it in the network. With HIP, an identifier is the public key of a public-private key pair. When the host possesses the private key, it can prove that it actually "owns" this identity that the public key represents; this is akin to showing an ID-card.

Each host can generate short-term keys to be used only for a short time. These are useful when it is not necessary for the node to be identified with the same identity later. For example, buying books from a bookstore may be a long-term relationship, while contacting a server once to collect user profiles may be considered to be a short-term action. In the latter case a short-term identity can be created to avoid more widespread dissemination of the long-term identity.

The HIP Host Identity (HI), being a public key, can be quite long and is therefore not practical in all situations. In HIP, the HI is represented with a 128-bit long Host Identity Tag (HIT) that is generated from the HI by hashing it. Thus, the HIT identifies a HI. Since the HIT is 128 bits long, it can be used for IPv6 applications directly as it is exactly the same length as IPv6 addresses.

Another representation of the Host Identities is the Local Scope Identifier (LSI), which is a 32-bit representation for the Host Identity. The purpose of the LSI is to facilitate using Host Identities in existing protocols and APIs. For example, since the LSI is the same length as an IPv4 address, it can be used for IPv4 applications directly. Although much of the remainder of this description will be based around the use of the longer HIT, it will be appreciated that the same or similar considerations apply to the alternative LSI representation.

When HIP is used, the upper layers, including the applications, no longer see the IP address. Instead, they see the HIT as the "address" of the destination host. The location information is hidden at a new layer, to be described below. The IP addresses no longer identify the nodes; they are only used for routing the packets in the network.

Applications are not typically interested in location information but do need to know the identity of their peers. The identity is represented by the HIT. This means that the IP address only has importance on lower layers where routing is concerned. The HITs, which the applications use, must be mapped to the corresponding IP addresses before any packets leave the host. This is achieved in a new Host Identity Layer as described below.

FIG. 1 of the accompanying drawings illustrates the various layers in HIP, comprising the standard transport layer 4, network layer 8 and link layer 10, with a process 2 communicating with the transport layer 4 below it. With HIP, a new Host Identity Layer 6 is disposed between the transport layer 4 and the network layer 8.

Locally, each HI and its associated HIT are mapped to the IP addresses of the node. When packets are leaving the host, the correct route is chosen (by whatever means) and corresponding IP addresses are put into the packet as the source and destination addresses. Each packet arriving from the upper layer contains the HIT of the peer as the destination address. The mapping between the HIT and the location information can be found at the HI layer 6. Hence, the destination address is converted to the mapped IP address, and the source HIT is converted to source IP address.

The mapping between a peer HIT and IP address can be retrieved in several ways, one of which being from a DNS server. The location information can be updated by the peer node any time. The update procedure will be discussed in more detail in the mobility management subsection.

HIP defines a base message exchange containing four messages, a four-way handshake, and this is used to create a security association (SA) between HIP-enabled hosts. During the message exchange, the Diffie-Hellman procedure is used to create a session key and to establish a pair of IPsec Encapsulating Security Payload (ESP) Security Associations (SAs) between the nodes.

FIG. 2 of the accompanying drawings illustrates the operation of the four-way handshake. The negotiating parties are referred to as the Initiator, starting the connection, and the Responder. The Initiator begins the negotiation by sending an I1 packet that contains the HITs of the nodes participating in the negotiation. The destination HIT may also be zeroed, if the Responder's HIT is not known by the Initiator.

When the Responder gets the I1 packet, it sends back an R1 packet that contains a puzzle to be solved by the Initiator. The protocol is designed so that the Initiator must do most of the calculation during the puzzle solving. This gives some protection against DoS attacks. The R1 initiates also the Diffie-Hellman procedure, containing the public key of the Responder together with the Diffie-Hellman parameters.

Once the R1 packet is received, the Initiator solves the puzzle and sends a response cookie in an I2 packet together with an IPsec SPI value and its encrypted public key to the Responder. The Responder verifies that the puzzle has been solved, authenticates the Initiator and creates the IPsec ESP SAs. The final R2 message contains the SPI value of the Responder.

The SAs between the hosts are bound to the Host Identities, represented by the HITs. However, the packets travelling in the network do not contain the actual HI information, but the arriving packet is identified and mapped to the correct SA using the Security Parameter Index (SPI) value in the IPsec header. FIG. 3 of the accompanying drawings shows the logical and actual packet structures when it travels in the network.

From the above it is clear that changing the location information in the packet does not create any problems for the IPsec processing. The packet is still correctly identified using the SPI. If, for some reason, the packet is routed to a wrong destination, the receiver is not able to open the packet as it does not have the correct key.

When an outgoing packet arrives at the HI layer from the above layer, the destination HIT is verified from the IPsec SADB. If an SA matching to the destination HIT is found, the packet is encrypted using the session key associated with the SA.

The HIT cannot be used to route the packet. Thus, the destination (and source) addresses must be changed to match the IP addresses of the nodes. These mappings are stored, as mentioned earlier, in the HI layer. After the addresses have been changed, the packet can be sent to the network where it is routed to the destination using the IP address information.

At the receiving host, the SPI value is used to find the correct SA form the IPsec SADB. If an entry is found, the IP addresses can be changed to corresponding HITs and the packet can be decrypted using the session key.

Mobility is defined to be the situation where a host moves while keeping its communication context active, or in other words the host changes its topological location, described by the IP address, while still maintaining all existing connections active. The processes running on the host do not see the mobility, except possibly if the experienced quality of service changes.

The mobile host can change the location inside one access network, between different access technologies, or even between different IP address realms, for example between the IPv4 and IPv6 networks. In HIP, the application doesn't notice the change in the IP address version. The HI layer hides the change completely from upper layers. Of course, the peer node must be able to handle the location update that changes the IP version and packets must be routable using some compatible address. If a node does not have both IPv4 and IPv6 connectivity, it may use a proxy node that performs the address version conversion and provides connectivity on behalf of the node.

Multi-homing refers to a situation where an end-point has several parallel communication paths that it can use. Usually multi-homing is a result of either the host having several network interfaces (end-host multi-homing) or due to a network between the host and the rest of the network having redundant paths (site multi-homing).

With HIP, the separation between the location and identity information makes it clear that the packet identification and routing can be cleanly separated from each other. The host receiving a packet identifies the sender by first getting the correct key and then decrypting the packet. Thus, the IP addresses that are in the packet are irrelevant.

A HIP Mobile Node (HMN), moving in the network, may change the point of attachment to the Internet constantly. When the connection point is changed, so does the IP address. This changed location information must be sent to the peer nodes, i.e. HIP Correspondent Nodes (HCN), and this is illustrated in FIG. 4 of the accompanying drawings. The same address can also be sent to a Forwarding Agent (FA) of the HMN, so that the HMN can be reached also via a more stable point. The DNS system is too slow to be used for constantly changing location information. Therefore, there must be a more stable address that can be used to contact the HMN. This address is the address provided by the FA.

The HIP Mobility and Multi-homing protocol (P. Nikander, J. Arkko, P. Jokela, "End-Host Mobility and Multihoming with Host Identity Protocol", Internet Draft, work in progress, draft-ietf-hip-mm-00, IETF, 2004) defines a update (UPDATE) packet that carries the readdress (REA) parameter which contains the current IP address of the HMN. When the HMN changes location and IP address, it generates a UPDATE packet, signs the packet with the private key matching to the used HI, and sends the packet to the peer node and to the FA.

When the peer node receives a UPDATE packet, it must start an address verification process for the IP address that is included in the UPDATE packet. The address verification is needed to avoid accepting false updates from the HMN. It sends an update acknowledgement (UPDATE-ACK) packet to the address that was in the UPDATE packet. When the HMN receives an UPDATE-ACK that matches to the UPDATE sent earlier, it may start using the new IP address for sending data to HCN. After the peer node has received the first data packet from the new address, the address verification is completed and it can add the IP address as the location information of the HMN.

Because the HMN can move between networks using different IP address versions, the address received by the HCN may also be from a different address family than the previous address.

The HCN may support only one IP address version. In this case, the HCN must use some other proxy node that can be used for routing packets over to the other IP address version network.

A multi-homed HIP host, having multiple IP addresses configured on different interfaces connected to different access networks, has much more possibilities to handle the traffic towards a peer node. As it has multiple IP addresses presenting its current location in the network, it may want to tell all of these addresses to its peer nodes. To do so, the multi-homed HIP node creates a UPDATE packet that contains all the addresses that it is able to use towards that particular node. This set of addresses may contain all addresses it has, or some subset of these addresses. When the peer node receives the UPDATE packet with the multiple addresses, it must make address verification for each of these addresses to avoid possible false updates.

False, or non-routable, addresses in the UPDATE packet may be caused either because the HMN is a malicious node, it has an error in the stack implementation, or the HMN may be inside a network that uses private addresses that are not routable in the Internet. A multi-homed HIP node is able to use all of the available connections, but efficient usage of the connections requires a policy system that has knowledge of the underlying access networks and can control the usage of them. Such a policy system can use different kinds of information: user preferences, operator preferences, input from the network connections, such as QoS, and so on.

In order to start the HIP exchange with a mobile node, the initiator node needs to know how to reach the mobile node. Although Dynamic DNS could be used for this function for infrequently moving nodes, an alternative to using DNS in this fashion is to use the piece of static infrastructure introduced above, the Forwarding Agent (also referred to as a HIP rendezvous server). Instead of registering its current dynamic address with the DNS server, the mobile node registers the address(es) of its Forwarding Agent(s). The mobile node keeps the Forwarding Agent(s) continuously updated with its current IP address(es). A Forwarding Agent simply forwards the initial HIP packet from an initiator to the mobile node at its current location. All further packets flow between the initiator and the mobile node. There is typically very little activity on a Forwarding Agent, mainly address updates and initial HIP packet forwarding. Thus, one Forwarding Agent can support a large number of potential mobile nodes. The mobile nodes must trust the Forwarding Agent to properly maintain their HIT and IP address mappings. A Forwarding Agent can be used even for nodes that are fixed in location, since it is often the case that fixed nodes can change their IP address frequently, for example when it is allocated each time an Internet connection is set up by a Service Provider for that node.

The Forwarding Agent is also needed if both of the nodes are mobile and happen to move at the same time. In that case, the HIP readdress packets will cross each other in the network and never reach the peer node. To solve this situation, the nodes should remember the Forwarding Agent address, and re-send the HIP readdress packet to the Forwarding Agent if no reply is received.

The mobile node keeps its address current on the Forwarding Agent by setting up a HIP association with the Forwarding Agent and sending HIP update packets, containing readdress, to it. A Forwarding Agent will permit two mobile systems to use HIP without any extraneous infrastructure (in addition to the Forwarding Agent itself), including DNS if they have a method other than a DNS query to get each other's HI and HIT.

In the case of legacy equipment, a host may not be HIP-enabled, and the only option is to identify connections between hosts using IP addresses. This is not secure. The situation may be improved by locating a HIP proxy between the HIP-enabled host and the host which cannot use HIP. A typical scenario would be a small corporate LAN where the client terminals are not HIP-enabled. Traffic is routed to correspondent hosts (which are HIP-enabled) via the HIP proxy.

This arrangement is illustrated in FIG. 5 of the accompanying drawings. In FIG. 5, a legacy host 12 is shown communicating with a HIP-enabled node 14 (having the domain name "hip.foo.com") via a HIP proxy 16. The legacy host 12 accesses the HIP proxy 16 over an access network 18 while the HIP proxy 16 accesses the HIP node 14 over the Internet 20. To partially secure the connection between the legacy host 12 and the HIP node 14, all communications between the HIP proxy 16 and the HIP node 14 are through a security Association set up between the HIP proxy 16 and the HIP node 14 in a similar way to that described above with reference to FIG. 3.

However, even before the Security Association 22 shown in FIG. 5 can be set up to enable communication between the legacy host 12 and the HIP node 14, a problem arises when the legacy host 12 tries to resolve the IP address of the HIP node 14 by sending a query to a DNS server 24-1 (and in turn DNS server 24-2) when the HIP node 14 is located behind a Forwarding Agent 26 as described above. The DNS server 24-1 will return the HIT of the HIP node 14 together with the IP address of the Forwarding Agent 26. As the legacy host 12 is not HIP enabled, it will disregard the HIT and start sending messages to the Forwarding Agent 26. Without the HIT, the Forwarding Agent 26 will not be able to resolve the destination address of these messages since it is most likely that several HIP nodes will use the same Forwarding Agent 26. Likewise, since the legacy host 12 discards the HIT and uses only the IP address of the HIP node 14 when initiating a connection, the HIP proxy 16 is unable to initiate HIP negotiation between itself and the HIP node 14 because it does not know the HIT of the HIP node 14. This problem is addressed in our PCT Application No. PCT/EP04/050129.

Other technical considerations arise when implementing HIP in third generation (3G) mobile telecommunications networks where not all of the User Equipments (UEs) in the 3G environment are HIP enabled. In this context, the Universal Mobile Telecommunications System (UMTS) is the 3G successor to the Global System for Mobile Communications (GSM). The most important evolutionary step of GSM towards UMTS is the General Packet Radio Service (GPRS). GPRS introduces packet switching into the GSM core network and allows direct access to packet data networks (PDNs). This enables high-data rate packet switched transmission well beyond the 64 kbps limit of ISDN through the GSM core network, which is a necessity for UMTS data transmission rates of up to 2 Mbps. GPRS is a prerequisite for the UMTS introduction.

It is desirable to provide at least some of the benefits of the Host Identity Protocol described above for communications between a legacy host operating within one network environment, such as UMTS or GPRS, and a HIP enabled host operating within another network environment, such as the Internet.

SUMMARY OF THE INVENTION

According to a first aspect of the present invention there is provided a method of at least partially securing communications between first and second hosts using the Host Identity Protocol, HIP, where the first host is not HIP enabled and the second host is HIP enabled, the method comprising: associating the first host with a persistent HIP identity maintained at a remote server; obtaining from the remote server a public part of the persistent HIP identity and a certificate authorising a gateway node between the first and second hosts to use a temporary HIP identity associated with the first host in a subsequent negotiating step; and negotiating a secure HIP connection between the gateway node and the second host using at least part of each of the persistent HIP identity, the temporary HIP identity and the certificate.

The obtaining step may comprise sending the public part of the temporary HIP identity to the remote server.

The obtaining step may comprise including the public part of the temporary HIP identity in the certificate.

The obtaining step may comprise signing the certificate at the remote server using the private key part of the persistent HIP identity.

The obtaining step may comprise sending the certificate to the gateway node.

The public part may be the public key part of the persistent HIP identity.

The negotiating step may comprise sending at least one packet from the gateway node to the second host, the at least one packet being signed using the private key part of the temporary HIP identity.

The negotiating step may comprise sending the certificate from the gateway node to the second host.

The negotiating step may comprise sending the public part of the persistent HIP identity from the gateway node to the second host.

The public part of the persistent HIP identity may be sent in the same packet as the certificate.

The certificate may be used at the second host to verify the right of the gateway node to use the temporary HIP identity during the negotiating step.

The public part of the persistent HIP identity and the certificate may be used to verify the right.

The HIP public identifier part of the persistent HIP identity may be included in a HIP header during negotiation of the HIP connection between the gateway and the second host.

The method may comprise generating the temporary HIP identity at the gateway node.

The remote server may communicate with a serving node between the first host and the gateway node during the obtaining step.

The obtaining step may comprise sending the public part of the temporary HIP identity from the gateway node to the serving node.

The serving node may be a Serving GPRS Support Node (SGSN).

The method may comprise updating information in a HIP rendezvous server relating to the location of the first host.

The updating step may be performed by the remote server in response to or during the obtaining step.

The HIP rendezvous server and the remote server may be provided as a single server.

The HIP rendezvous server may be located in the home network of the first host.

The gateway node may provide the functionality of a HIP proxy.

The gateway node may be a Gateway GPRS Support Node (GGSN).

The remote server may be located in the home network of the first host.

The remote server may be an authentication server.

The method may comprise, when a new gateway node becomes active between the first and second hosts, using the same persistent HIP identity for the first host as a basis for negotiating a new secure HIP connection between the new gateway node and the second host.

The method may comprise using a look-up process at the new gateway node to locate the second host, based on the HIP public identifier for the second host included in a subsequent communication from the first host towards the second host.

The method may comprise dropping the previous secure HIP connection.

According to a second aspect of the present invention there is provided a Host Identity Protocol, HIP, method for use in a network in which a non-HIP-enabled host is in communication with a HIP-enabled host via a plurality of gateway nodes in turn, comprising using a persistent HIP identity for the first host, maintained at a remote server, for each such gateway node used. According to a third aspect of the present invention there is provided a communications system comprising: first and second hosts, where the first host is not Host Identity Protocol, HIP, enabled and the second host is HIP enabled; a gateway node between the first and second hosts; a remote server for maintaining a persistent HIP identity associated with the first host; means for obtaining from the remote server a public part of the persistent HIP identity and a certificate authorising the gateway node to use a temporary HIP identity associated with the first host to negotiate a secure HIP connection; and means for negotiating a secure HIP connection between the gateway node and the second host using at least part of each of the persistent HIP identity, the temporary HIP identity and the certificate, thereby at least partially securing communications between the first and second hosts using the Host Identity Protocol.

According to a fourth aspect of the present invention there is provided a method, for use by a serving node of a network, of enabling communications between first and second hosts of the network to be at least partially secured using the Host Identity Protocol, HIP, where the first host is not HIP enabled and the second host is HIP enabled, the network comprising a remote server for maintaining a persistent HIP identity associated with the first host, and the method comprising: obtaining from the remote server a public part of the persistent HIP identity and a certificate authorising a gateway node of the network between the first and second hosts to use a temporary HIP identity associated with the first host in a subsequent step to negotiate a secure HIP connection between the gateway node and the second host using at least part of each of the persistent HIP identity, the temporary HIP identity and the certificate.

According to a fifth aspect of the present invention there is provided an apparatus, for use as a serving node of a network, for enabling communications between first and second hosts of the network to be at least partially secured using the Host Identity Protocol, HIP, where the first host is not HIP enabled and the second host is HIP enabled, the network comprising a remote server for maintaining a persistent HIP identity associated with the first host, and the apparatus comprising: means for obtaining from the remote server a public part of the persistent HIP identity and a certificate authorising a gateway node of the network between the first and second hosts to use a temporary HIP identity associated with the first host in a subsequent process to negotiate a secure HIP connection between the gateway node and the second host using at least part of each of the persistent HIP identity, the temporary HIP identity and the certificate.

According to a sixth aspect of the present invention there is provided a method, for use by a gateway node between first and second hosts of a network, of enabling communications between the first and second hosts to be at least partially secured using the Host Identity Protocol, HIP, where the first host is not HIP enabled and the second host is HIP enabled, the network comprising a remote server for maintaining a persistent HIP identity associated with the first host, and means for obtaining from the remote server a public part of the persistent HIP identity and a certificate authorising the gateway node to use a temporary HIP identity associated with the first host, and the method comprising: negotiating a secure HIP connection between the gateway node and the second host using at least part of each of the persistent HIP identity, the temporary HIP identity and the certificate.

According to a seventh aspect of the present invention there is provided an apparatus, for use as a gateway node between first and second hosts of a network, for enabling communications between the first and second hosts to be at least partially secured using the Host Identity Protocol, HIP, where the first host is not HIP enabled and the second host is HIP enabled, the network comprising a remote server for maintaining a persistent HIP identity associated with the first host, and means for obtaining from the remote server a public part of the persistent HIP identity and a certificate authorising the apparatus to use a temporary HIP identity associated with the first host, the apparatus comprising: means for negotiating a secure HIP connection between the apparatus and the second host using at least part of each of the persistent HIP identity, the temporary HIP identity and the certificate.

According to an eighth aspect of the present invention there is provided an operating program which, when run on an apparatus, causes the apparatus node to carry out a method according to the fourth or sixth aspect of the present invention.

According to a ninth aspect of the present invention there is provided an operating program which, when loaded into an apparatus, causes the apparatus to become apparatus according to the fifth or seventh aspect of the present invention.

The operating program may be carried on a carrier medium. The carrier medium may be a transmission medium. The carrier medium may be a storage medium.

In the context of the invention, a HIP identity comprises a HIP key pair, itself comprising a HIP public key and a HIP private key. Associated with the HIP public key in the HIP identity is a separate HIP public identifier, which may be for example a Host Identity Tag (HIT) or a Local Scope Identifier (LSI) as described above. A public part of the HIP identity is either the HIP public key or the HIP public identifier or both. The HIP public identifier may be generated from the HIP public key as required.

BRIEF DESCRIPTION OF THE DRAWINGS

FIG. 2, also discussed hereinbefore, illustrates the operation of the four-way handshake in the HIP protocol;

FIG. 3, also discussed hereinbefore, shows the logical and actual packet structures in HIP;

FIG. 11 illustrates the contents of the HIP and IP headers for certain messages sent in the method.

Embodiments of the present invention will be described within the framework of the GPRS/UMTS network architecture shown in FIG. 6. The principles underlying an embodiment of the present invention are equally applicable to UMTS as they are to GPRS.

As mentioned above, GPRS has been designed as an extension to the existing GSM network infrastructure, with the aim of providing a connectionless packet data service. GPRS introduces a number of new functional elements over GSM that support the end-to-end transport of IP-based packet data, as will be described below.

Figure 1:
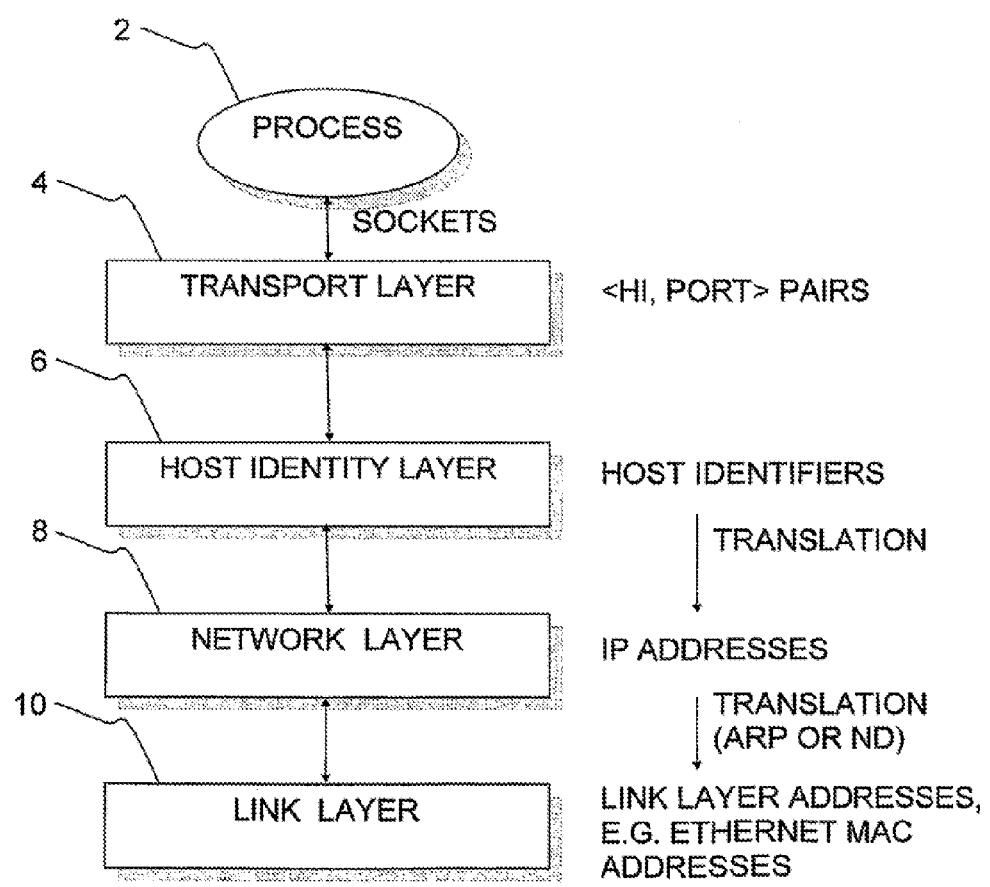
FIG. 1, discussed hereinbefore, illustrates the various layers in the Host Identity Protocol.
Figure 4:
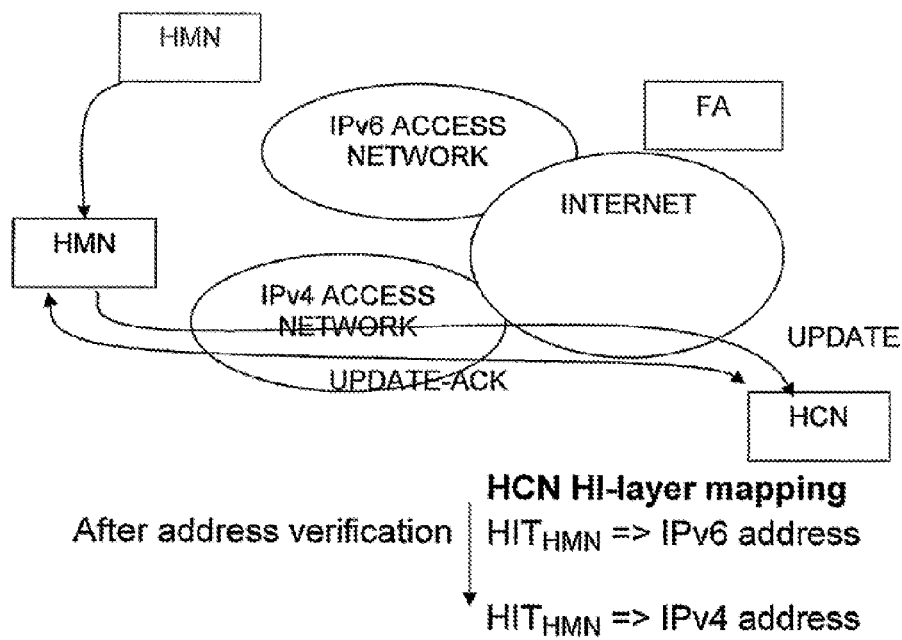
FIG. 4, also discussed hereinbefore, illustrates a handover between IPv6 and IPv4.
Figure 5:
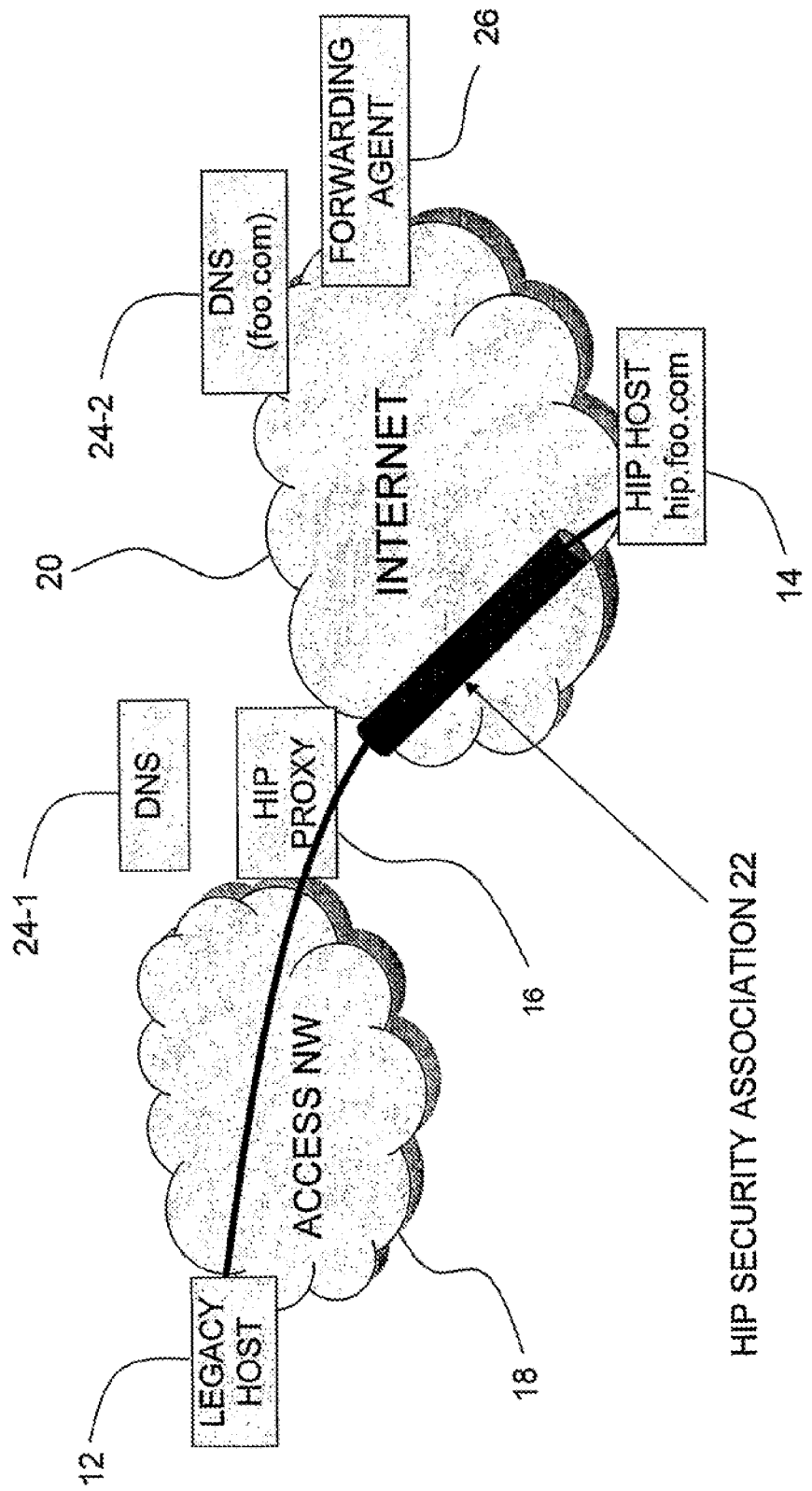
FIG. 5, also discussed hereinbefore, is a schematic diagram illustrating the general network setup for communications between a legacy host and a HIP mode via a HIP proxy.
Figure 6:
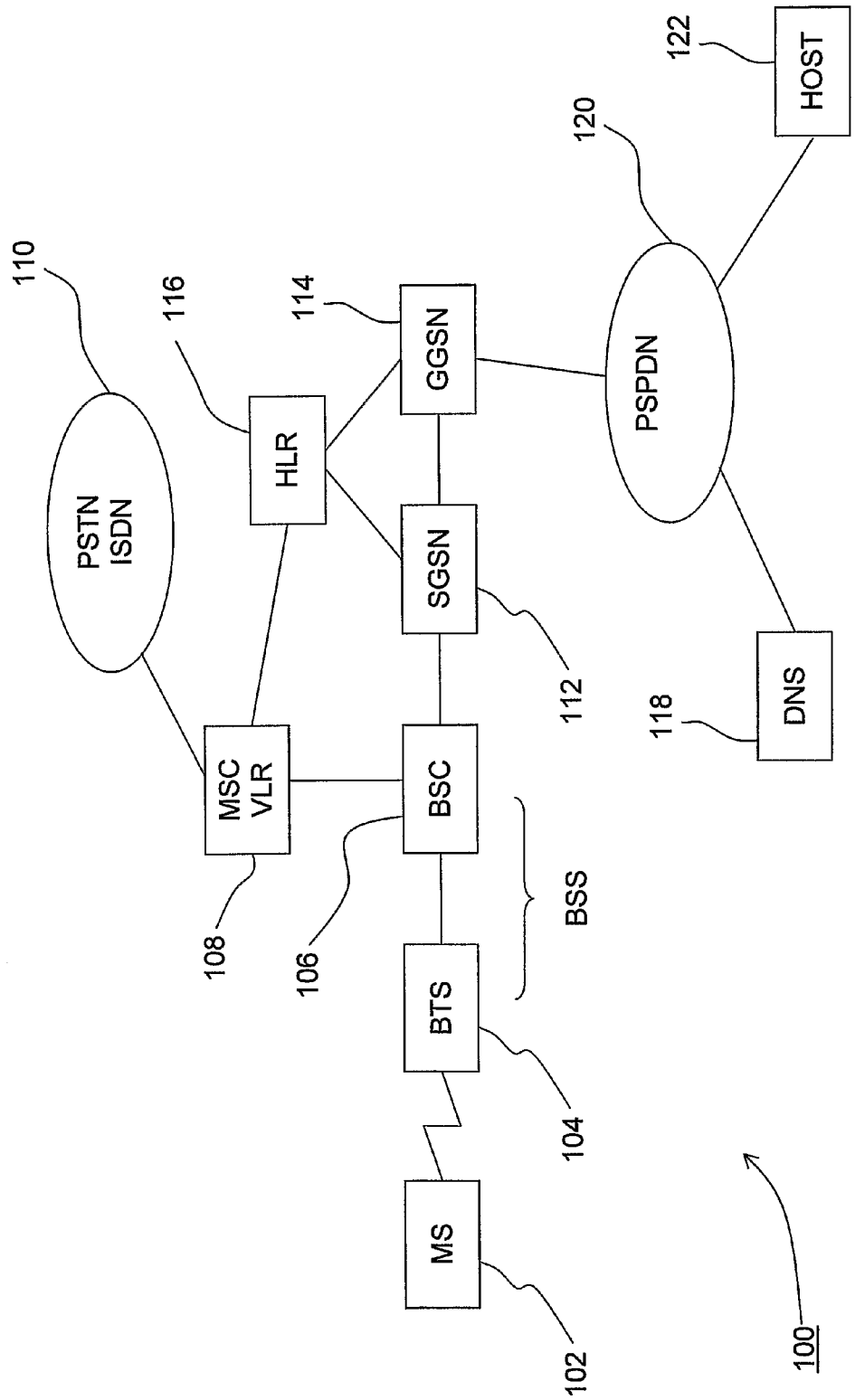
FIG. 6 is a block diagram showing elements of a GPRS/UMTS network architecture to which an embodiment of the present invention is applied.

The communications system 100 shown in FIG. 6 comprises a mobile station (MS) 102 in communication with a Base Transceiver Station (BTS) 104 which in turn communicates with a Base Station Controller (BSC) 106. The BTS 104 and BSC 106 together make up the Base Station Subsystem (BSS). At the BSC 106, a Packet Control Unit (PCU, not shown) differentiates circuit switched data destined for a telephony network 110 from packet switched data destined for a packet data network 120. The telephony network 110 can be, for example, a Public Switched Telephone Network (PSTN) or Integrated Services Digital Network (ISDN), while the packet data network can be, for example, a Packet Switched Public Data Network, the Internet, or a corporate LAN.

Circuit switched data is routed to the telephony network 110 via a Mobile Switching Centre (MSC) incorporating Visitor Location Register (VLR). On the other hand, packet switched data is routed to the packet data network 120 via a Serving GPRS Support Node (SGSN) 112 and a Gateway GPRS Support Node (GGSN) 114. The MSC 108, SGSN 112 and GGSN 114 have access to a Home Location Register (HLR) 116 which is a database containing subscriber information, for example services, account status information, preferences and IP addresses associated with subscribers. In FIG. 6, a Domain Name System (DNS) server 118 is shown as accessible through the packet data network 120. Also shown is a host 122 connected to the packet data network 120.

Two major new core network elements are introduced with GPRS over the standard GSM network: the SGSN 112 and the GGSN 114. The SGSN 112 monitors the state of the mobile station 102 and tracks its movements within a given geographical area. It is also responsible for establishing and managing the data connections between the mobile user and the destination network. If the user moves into a segment of the network that is managed by a different SGSN it will perform a handoff to the new SGSN.

The GGSN 114 provides the point of attachment between the GPRS network environment and the external packet data network environment 120, such as the Internet and corporate Intranets. Each external network 120 is given, a unique Access Point Name (APN) which is used by the mobile user to establish the connection to the required destination network.

Before the mobile station 102 is able to use GPRS services, it must register with the SGSN 112 of the GPRS network using the GPRS attach procedure. During the attach procedure, the network checks if the user is authorised, copies the user profile from the HLR 116 to the SGSN 112, and assigns a packet temporary mobile subscriber identity (P-TMSI) to the user. Where the mobile station 102 was already connected to a SGSN 112, an update location message is sent to the appropriate HLR 116 which performs a location updating process in view of the new SGSN 112. More detailed information concerning the GPRS Attach procedure can be found in section 6.5 of the GPRS Technical Specification 3GPP TS 23.060 V6.3.0 (2003-12). The disconnection from the GPRS network is called GPRS detach. It can be initiated by the mobile station or by the network (SGSN 112 or HLR 116).

Upon completing the Attach procedure, the network is able to track the MS 102 (via subsequent location updates) and is aware of the services and networks that the user has access to. However, at this point, the user is not able to send or receive data to or from the packet data network 120. To exchange data packets with the packet data network 120 after a successful GPRS attach, a Packet Data Protocol (PDP) context must first be activated.

In a prior art GPRS system, without the HIP protocol, to exchange data packets with an external packet data network after a successful GPRS attach, a mobile station must apply for one or more addresses in the packet data network, for example for an IP address in the case where the packet data network is an IP network. This address is called the PDP address. For each session, a PDP context is created, which describes the characteristics of the session. It contains the PDP type (for example, IPv4), the PDP address assigned to the mobile station, the requested quality of service (QoS), and the address of a GGSN 114 that serves as the access point to the packet data network. This context is stored in the mobile station 102, the SGSN 112, and the GGSN 114. With an active PDP context, the mobile station 102 is "visible" to the external packet data network 120 and is able to send and receive data packets. The mapping between the two addresses, PDP and IMSI (International Mobile System Identifier), enables the GGSN 114 to transfer data packets between the packet data network 120 and the mobile station 102.

Figure 7:
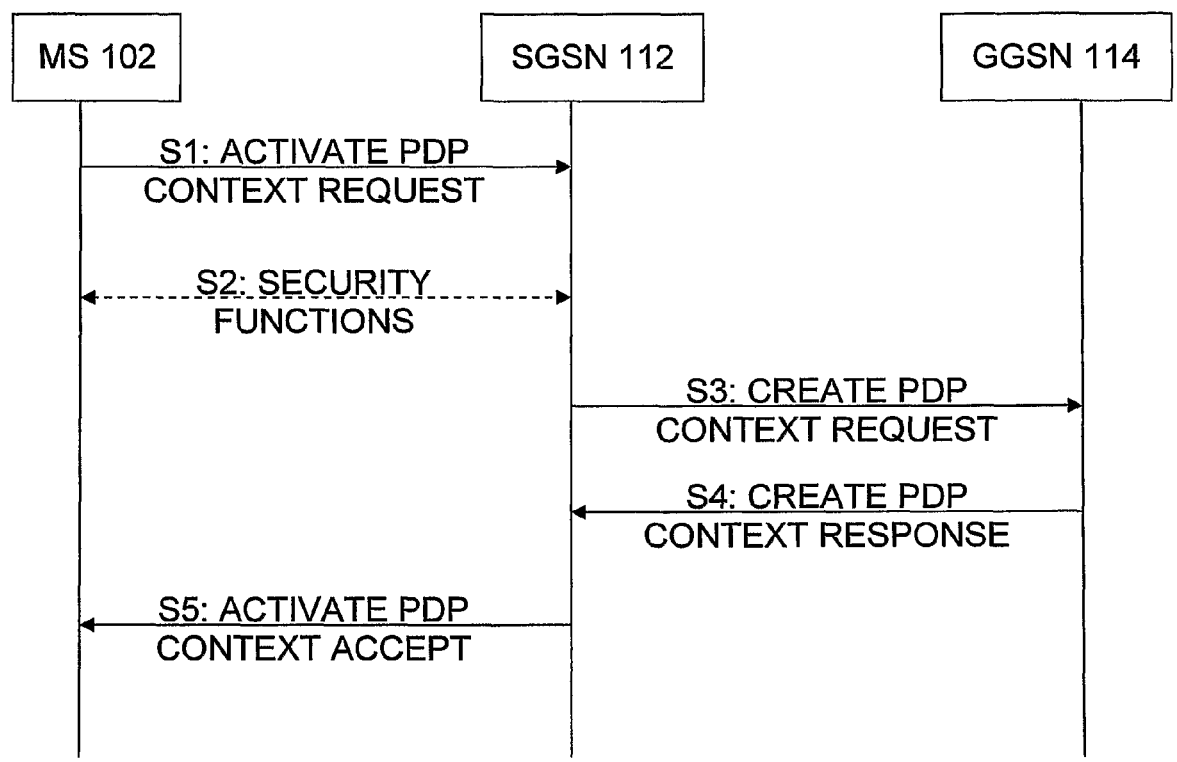
FIG. 7 is a signal diagram showing an example of a PDP context activation procedure.

FIG. 7 shows an example of such a PDP context activation procedure. In step S1, an Activate PDP Context Request is sent from the MS 102 to the SGSN 112. In step S2, the usual security functions (for example, authentication of the user) are performed. If access is granted, the SGSN 112 will send a Create PDP Context Request message to the affected GGSN 114 (step S3). The GGSN 114 creates a new entry in its PDP context table, which enables the GGSN 114 to route data packets between the SGSN 112 and the external packet data network 120. The GGSN 114 then returns, in step S4, a Create PDP Context Response to the SGSN 112 which contains the PDP address assigned, for example an IPv4 address. The SGSN 112 updates its PDP context table and confirms the activation of the new PDP context to the MS 102 with an Activate PDP Context Accept message in step S5. The GPRS PDP Context Activation procedure is described in more detail in section 9.2.2 of the above-mentioned GPRS Technical Specification, and the message exchanges described above (called "Tunnel Management Messages") are described in further detail in section 7.3 of the UMTS/GPRS Technical Specification ETSI TS 129.060 V5.8.0 (2003-12).

Our PCT Application No. PCT/EP04/050533 discloses a system in which the above-described PDP Context Activation procedure still applies but is modified to enable communications between the mobile station 102 in the GPRS network environment and the host 122 in the packet data network environment 120 to be at least partially secured using HIP. As described above, to provide HIP support for nodes inside a network, a HIP proxy is required to at least partially provide the advantages of HIP for legacy terminals operating within the network environment. In the context of the GPRS network environment, PCT Application No. PCT/EP04/050533 discloses a system in which the HIP proxy is provided as part of the GGSN 114, so that the GGSN 114 of FIG. 6 is a GGSN HIP proxy 114.

This basic approach is followed in an embodiment of the present invention, although there are significant implementation differences to be described further below. Nevertheless, a description of the previous approach will be helpful in an understanding of an embodiment of the present invention.

The system disclosed in PCT Application No. PCT/EP04/050533 will now be described in more detail with reference to FIG. 8, in which the host 122 of FIG. 6 is a HIP-enabled host 122 and the mobile station 102 is a legacy (non-HIP-enabled) mobile station 102.

Figure 8:
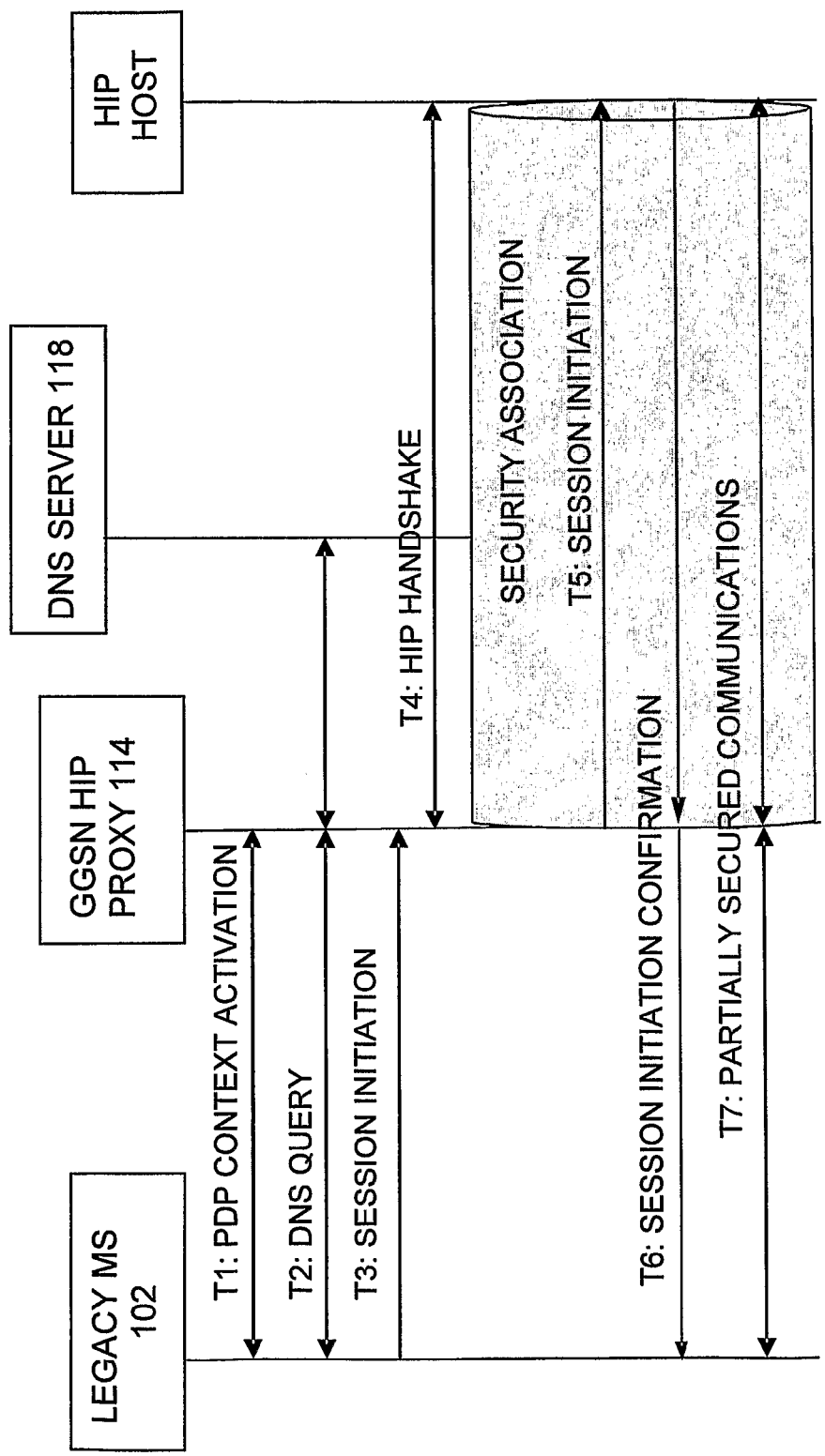
FIG. 8 is a signal diagram illustrating a method of using the Host Identity Protocol to at least partially secure communications between a legacy first host and a HIP-enabled second host.

FIG. 8 is a signal diagram illustrating a method disclosed in PCT Application No. PCT/EP04/050533 of using the Host Identity Protocol to at least partially secure communications between a first host (the legacy MS 102) operating in a first network environment (the GPRS network environment) and a second host (the HIP host 122) operating in a second network environment (the packet data switched network environment). The GGSN HIP proxy 114 forms a gateway between the two network environments.

Figure 9:
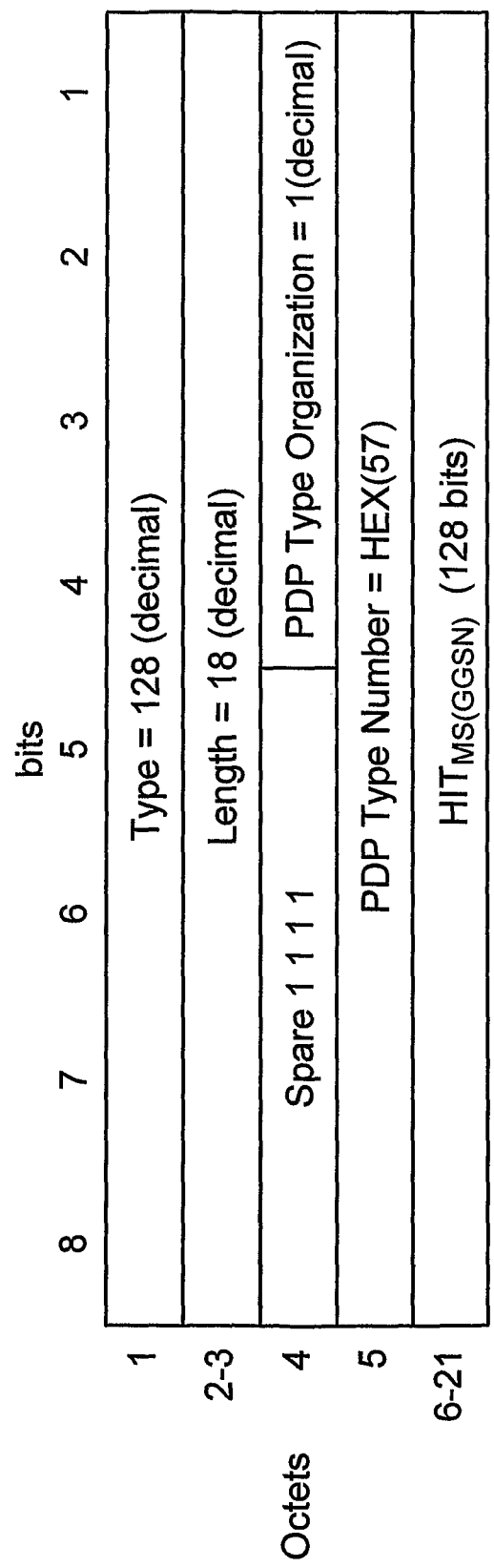
FIG. 9 illustrates the End User Address information using a 128-bit representation for the identifier.
Figure 10:
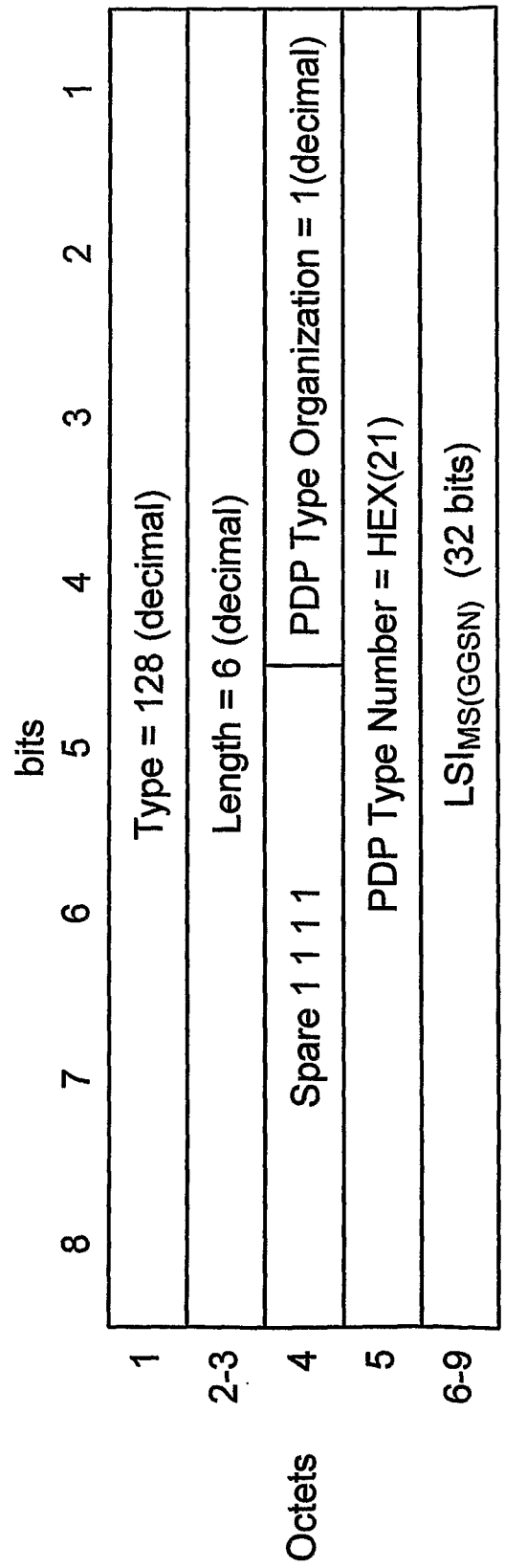
FIG. 10 illustrates the End User Address information using a 32-bit representation for the identifier.

In step T1, the legacy MS 102 initiates a PDP context activation procedure. In the PDP context activation procedure according to this example, the GGSN HIP proxy 114 generates a key-pair (HI and secret key) and associates it with the legacy MS 102, storing the key-pair in the GGSN HIP proxy 114. Based on the public key (HI), an identifier is generated and associated with the legacy MS 102, and then sent to the legacy MS 102 as the address to be used in the PDP context. This differs from a conventional PDP Context Activation procedure described above where an IP address is usually returned to the mobile station 102 as the PDP address.

Where IPv6 is being used at the legacy MS 102, the identifier associated with the legacy MS 102 is a Host Identifier Tag (HIT) described above, which is of the same length as an IPv6 address, and is referred to here as HITMS (GGSN).

Where IPv4 is being used at the legacy MS 102, the identifier is a Local Scope Identifier (LSI) described above, which is of the same length as an IPv4 address, and is referred to here as LSIMS (GGSN). In the former case (IPv6), the End User Address in the Create PDP Context Response is illustrated in FIG. 9, while in the latter case (IPv4), the End User Address is illustrated in FIG. 10.

The identifier, in whatever form, is received by the legacy MS 102 in the End User Address, and the MS 102 stores the identifier for use as the source address in a subsequent session initiation message to be described below. It is therefore important the length of the identifier is the same as the source address field of the addressing scheme used by the legacy MS 102.

When the legacy MS 102 subsequently wishes to make a connection to the HIP host 122, as indicated by step T2 of FIG. 8, it sends a DNS query to acquire the IP address of the HIP host 122. The DNS query travels via the GGSN HIP proxy 114 to the DNS server 118. The DNS server 118 returns the IP address of the HIP host 122, IPHH, as well as the HIT for the HIP host 122, HITHH, and this information is stored at the GGSN HIP proxy 114. HITHH is then sent to the legacy MS 102, and will be used as a destination indicator in a subsequent session initiation message to be described below. The destination indicator will be inserted into the destination address field of the session initiation message, and therefore it is important that the destination indicator is of the same length as the destination address field of the session initiation message. Therefore, if the legacy MS 102 is only IPv4 capable, the destination indicator that is sent to the legacy MS 102 in response to its DNS query must be of the same length as an IPv4 address. The GGSN HIP proxy 114 must therefore allocate an LSI, or an IPv4 address, or some other 32-bit representation for the HIP host 122, which is unique within the mobile network environment. Address translation is subsequently required at the GGSN HIP proxy 114, which will be readily achievable by the skilled person.

In step T3, a session initiation message is sent from the legacy MS 102 to the GGSN HIP proxy 114, with the source field in the IP header set to the HITMS (GGSN) identifier and the destination field set to HITHH, as indicated in FIG. 11. In the case of IPv4 addressing, the destination address is set to the LSI of the HIP host 122, LSIHH (or the LSI allocated to the HIP host 122 where IPv6 to IPv4 translation is in operation).

Upon receipt of the session initiation message, the GGSN HIP proxy 114 notices that it has stored a HIT (or LSI) which matches the received packet's destination HIT (or LSI) following the DNS query described above in step T2. Therefore the GGSN HIP proxy 114 knows that the intended destination node is HIP-enabled and that communications between the legacy MS 102 and the HIP host 122 can be at least partially secured using the Host Identity Protocol. In this example, the GGSN HIP proxy 114 cannot find a Security Association for a connection between it and the HIP host 122, so it subsequently performs the HIP 4-way handshake described above with reference to FIG. 2 to create a Security Association between the GGSN HIP proxy 114 and the HIP host 122. The HIP handshake is shown in FIG. 8 as step T4.

The I1 and R1 packet headers for the 4-way HIP handshake are shown in FIG. 11. In the HIP header for the I1 and R1 packets, the Initiator field is set to HITMS (GGSN) and the Responder field is set to HITHH. In the IP header, IPGGSN is used in the source field of the I1 packet and the destination field of the R1 packet, while IPHH is used in the destination field of the I1 packet and the source field of the R1 packet.

When the Security Association has been set up between the GGSN HIP proxy 114 and the HIP host 122, in step T5 the GGSN HIP proxy 114 sends the session initiation message (received from the legacy MS 102 in step T3) to the HIP host 122 using the Security Association. In step TG, a session initiation confirmation is returned to the legacy MS 102.

Subsequent communications between the legacy MS 102 and the HIP host 122 can now continue, with communications between the GGSN HIP proxy 114 and the HIP host 122 protected with the HIP Security Association. When the GGSN HIP proxy 114 receives a packet from the HIP host 122 it processes it and sends the data as a regular IP packet to the legacy MS 102 based on the packet's destination HIT which is the same as that assigned to the legacy MS 102 in step T1.

As described above, during the HIP negotiation to set up the Security Association between the GGSN HIP proxy 114 and the HIP host 122, and during subsequent communications between the legacy MS 102 and the HIP host 122 via the GGSN HIP proxy 114, the HITMS (GGSN) and associated key-pair generated for the legacy MS 102 are used, rather than the HIT and key pair of the GGSN HIP proxy 114 itself. This is so that a separate Security Association (or pair of Security Associations) is created for each legacy MS 102 communicating with the HIP host 122. If the HIT and key pair of the GGSN HIP proxy 114 were used, and there were multiple mobile stations communicating with the same HIP host 122, the communication between the GGSN HIP proxy 114 and the HIP host 122 would use the same Security Association and there would not be any information that could be used at the GGSN HIP proxy 114 to separate the connections between different Mobile Stations; all incoming packets from the peer would contain the same destination IP and SPI. However, if there were only one MS talking to a particular HIP host 122, it would be possible to use the HIT and key pair of the GGSN HIP proxy 114.

In the example described above, following the DNS query in step T2/P2, the HIPHH of the HIP host 122 was returned to the MS 102 as part of the DNS response. Subsequently, HITHH was used as the destination IP address in the session initiation message, with an appropriate translation from HITHH to IPHH at the GGSN HIP proxy 114 before the I1 packet was sent to the HIP host 122. It will be appreciated that the actual IP address, IPHH, could also be returned to the MS 102 as part of the DNS response so that IPHH could be used directly in the destination IP address field of the session initiation message. In this case, the GGSN HIP proxy 114 would need to determine that the host 122 is actually HIP enabled in some way, for example by referring to the locally-stored association between HITHH and IPHH.

In the above example, the identifier HITMS (GGSN) is used during the HIP negotiation and therefore it must be in the correct form and associated with a key-pair. However, even in the this example the identifier HITMS (GGSN) does not itself need to be sent to the legacy MS 102; all that is required is that some sort of identifier relating to HITMS (GGSN) is sent to the legacy MS 102 and subsequently used as the source IP address in the session initiation message. This identifier could then be linked at the GGSN HIP proxy 114 to HITMS (GGSN) for use in the subsequent HIP negotiation.

As described above, PCT Application No. PCT/EP04/ 050533 discloses a system in which a temporary HIP private key, public key (HI) and HIT are created for a legacy terminal at the GGSN in response to a PDP Context Activation Request from the SGSN to which the legacy terminal is attached. This temporary HIP identity is then used to negotiate a secure HIP connection between the GGSN and a HIP host with which the legacy terminal is attempting to communicate. In particular, the temporary HIT is used in negotiation packets, and the packets are signed at the GGSN with the temporary HIP private key.

However, with such an approach as set out in PCT Application No. PCT/EP04/050533 there is no permanent or persistent HIP identity associated with the legacy terminal, but rather a different and temporary HIP identity is created for each GGSN used. There is no possibility for the legacy terminal to roam between different networks using the same HIP identity. The benefit of HIP in terms of there being a unique association between a terminal and a single HIP identity is therefore partly negated by this approach.

The approach taken in an embodiment of the present invention is to provide the legacy terminal with a persistent HIP identity of its own. Since the legacy terminal is by definition not HIP enabled, it cannot know about or understand HIP identities, so the HIP identity for the legacy terminal (private key, public key or HI, HIT) is generated and stored at a remote server.

One potential problem with this approach is that the GGSN requires not only the public HIT associated with the legacy terminal, but also the HIP private key associated with the legacy terminal. It would be insecure to transmit the HIP private key from the remote server to the GGSN, and so a different approach is required.

However, in an embodiment of the present invention, only the legacy terminal's public identity is transmitted from the remote server to the GGSN, and a new, temporary, HIP identity is generated at the GGSN and associated with the legacy terminal. The remote server also sends a certificate to the GGSN which authorises the GGSN to use the temporary HIP identity to negotiate a secure HIP connection on behalf of the legacy terminal. The certificate is requested from the remote server when the legacy terminal contacts the radio network. The certificate request may be combined with authentication data request (Technical Specification 3GPP TS 33.102 V6.3.0 (2004-12) sec. 6.3.2) or it may be done separately after the authentication data request. The temporary identities may be pre-generated or the network may generate them on request as a new legacy terminal enters the visited network area.

During HIP negotiation between the GGSN and the second (HIP-enabled) host, the legacy terminal's persistent HIT is used in the packet headers, but the packets are signed with the temporary private key. This mis-match is identified by the HIP host, but is resolved by reference to the certificate which is sent from the GGSN to the HIP host during HIP negotiation. The certificate verifies that the GGSN is authorised to use negotiate a HIP connection on behalf of the legacy terminal identified by the HIT, and this allows HIP negotiation to continue so that a secure HIP connection can be created between the GGSN and the HIP host.

Figure 12:
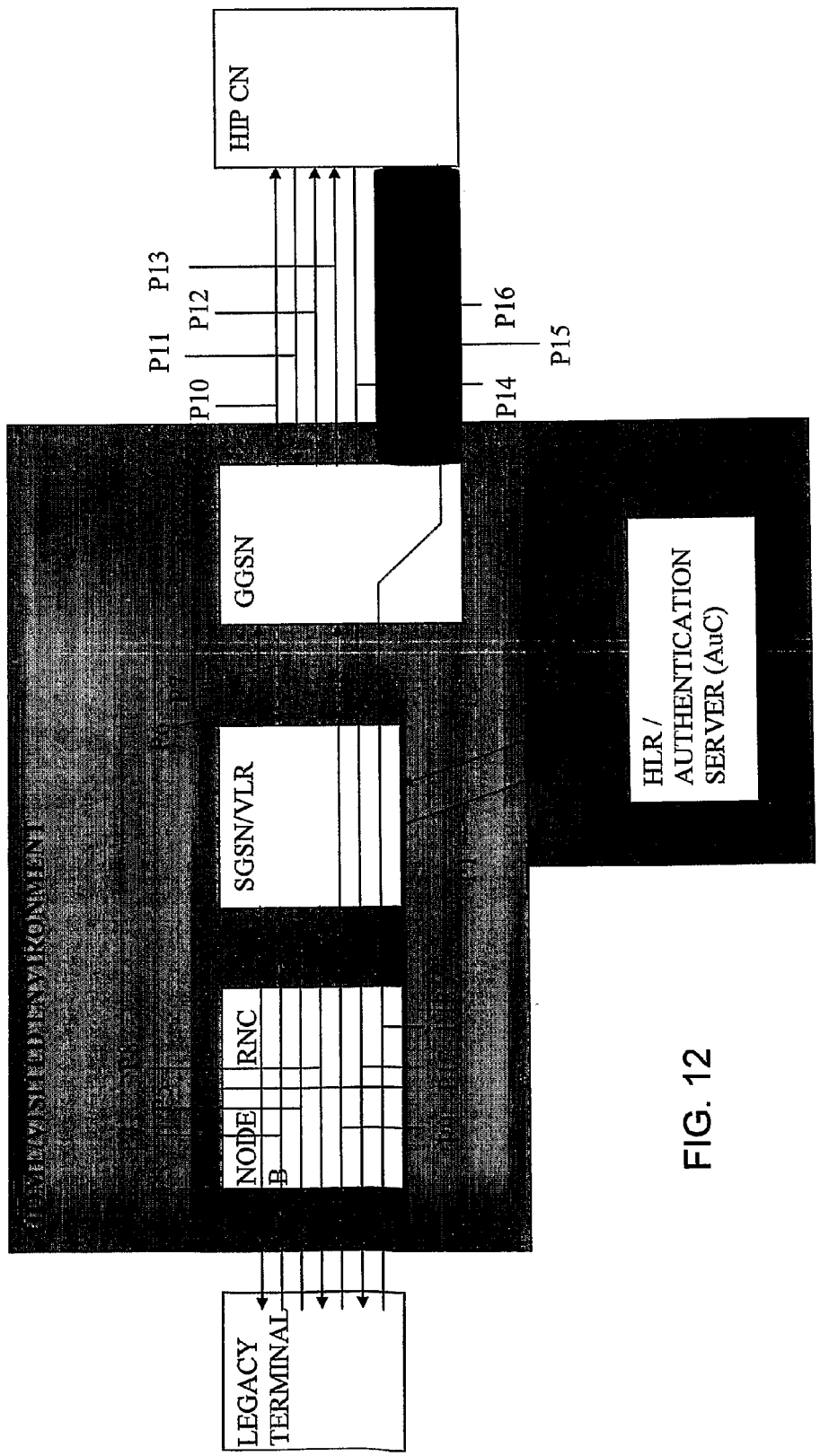
FIG. 12 is a signal diagram illustrating a method according to an embodiment of the present invention.

A specific embodiment of the present invention which follows the above approach will now be described with reference to FIG. 12. The HLR/Authentication server (AuC) shown in FIG. 12 is the same as the "remote server" referred to above, and the terms authentication server and remote server are equivalent in this context. The nodes in the home environment and in the visited environment are the essentially the same, the only difference being that when the legacy terminal is in visited environment the authentication server remains at the legacy terminal's home environment and the visited environment will use the legacy terminal's home environment authentication server.

The following steps in a method embodying the present invention correspond to those shown in FIG. 12.

Step P1:
In response to the legacy terminal making a request to attach to the radio network (Node B and RNC or Radio Network Controller, equivalent to the BTS 104 and BSC 106 of FIG. 6), the SGSN/VLR requests authentication of the legacy terminal.

A temporary HIP identity is now chosen for the legacy terminal, comprising a temporary HIP private key and a temporary HIP public key. The GGSN requires the temporary private key for the HIP negotiation in order to be able to sign the HIP packets (for more details of this, see below), and the temporary private key must remain at the GGSN for security. Also, the SGSN requires the temporary public key for sending to the authentication server to be certified.

A HIP private key is always the source for a HIP public key, and thus the GGSN has to provide the temporary public key to the SGSN in some way or other. The temporary public key to be certified must match with the private key that the GGSN subsequently uses in the HIP negotiation. In order to prove that the GGSN has the right to sign the packets on behalf of the legacy terminal using the temporary private key, the GGSN also has to have the matching temporary public key that has been certified with the legacy terminal's persistent HIP identity (private key).

The temporary HIP identity may either be generated at the GGSN in response to a request in step P1 from the SGSN, with the temporary public key being supplied to the SGSN for sending to the authentication server, or a pool of temporary identities may be pre-generated, with one or more of the pre-generated temporary public keys being supplied in advance for the SGSN to use as required in step P1. In either case, the GGSN must subsequently use the matching temporary private key in HIP negotiations.

Step P2:
The authentication server responds with an authentication vector (Technical Specification 3GPP TS 33.102 V6.3.0 (2004-12) sec. 6.3.2), the requested certificate, and the persistent public key of the legacy terminal. The authentication server maintains a database of persistent HIP identities for the legacy terminals associated with it. The certificate contains the legacy terminal's persistent public key as the issuer, temporary public key as the subject, and information related to validity time and what type of action that this certificate authorizes the subject. The certificate is signed with the legacy terminal's persistent private key.

Step P3:
The SGSN/VLR sends a User Authentication Request to the terminal (Technical Specification 3GPP TS 33.102 V6.3.0 (2004-12) sec. 6.3.1)

Step P4:
The legacy terminal responds with the User Authentication Response.

Step P5:
The legacy terminal sends a PDP context activation request to the SGSN.

Step P6:
The SGSN sends the PDP context activation request to the GGSN, including in the request the certificate and the legacy terminal's persistent public key.

Step P7:
The GGSN responds with the PDP context activation response to SGSN.

Step P8:
The SGSN forwards the PDP context activation response to the legacy terminal. The assigned address is the HIT or LSI generated from the legacy terminal's persistent public key. As mentioned above, the HIT or LSI is of the same length as the address in the IP addressing scheme used by the first host. An outbound connection (from legacy terminal to HIP CN) is then set up as follows.

Step P9:

The legacy terminal initiates a connection towards the HIP CN (with a TCP SYN message).

Step P10:

The HIP negotiation is started with an I1 packet, containing HITCN and HITLT (where LT stands for legacy terminal) in the HIP header.

Step P11:

The HIP CN responds with the R1 packet.

Step P12:

The GGSN sends the I2 packet with the same HITs as for the I1 packet. It sets a certificate bit in the packet so that the HIP CN knows that a certificate will follow. The HIP CN is not capable of verifying the I2 packet yet, because it contains the "wrong" signature: the HIT is generated from the persistent public key, but the packet is signed with the temporary private key generated at the GGSN.

Step P13:

The GGSN sends the certificate to the HIP CN. From the certificate the HIP CN can validate that the HIP signaling responsibility is delegated to the temporary HIP identity.

Step P14:

The HIP negotiation is finalized with the R2 packet. An IPsec security association has now been created between the GGSN and the HIP CN.

Step P15:

A TCP SYN packet is sent over the IPsec connection to establish the data connection.

Step P16:

A TCP SYN ACK packet is sent from the HIP CN to the GGSN over the IPsec connection.

Step P17:

A TCP SYN ACK packet is sent to the legacy terminal.

Step P18:

Data transmission can be initiated, at least partly secured by the secure HIP connection now set up between the GGSN and the HIP CN.

The above-described process is relevant for outbound connections from the legacy terminal towards the HIP CN. There now follows a description of how an embodiment of the present invention can be applied to incoming connections from the HIP CN towards the legacy terminal.

In the Host Identity Protocol, a rendezvous server or Forwarding Agent is defined that is used as the forwarding point, towards the current location of the actual destination host, for the connection initialisation packet (I1). The HIP host updates the rendezvous server with its current location, which in turn can forward an incoming I1 packet using the HIT to map the current location of the HIP host. The concept and basic operation of a HIP rendezvous server or Forwarding Agent is described in more detail above.

The context activation proceeds as described above in steps P1 to P8. Thereafter, the authentication server maintains the current GGSN information for the legacy terminal.

The DNS referred to above contains information about the legacy terminal. In the context of an embodiment of the present invention, it would contain, for example, the FQDN (fully qualified domain name) of the legacy terminal, the persistent Host Identity of the legacy terminal maintained by the home network (at the authentication server or some other node), and the IP address to the fixed rendezvous server that is located somewhere in the home network. The fixed rendezvous server can be, for example, the authentication server (which may not be ideal, as it would be required to be directly connected to the Internet), the "home" GGSN, or a separate rendezvous node of some sort. When the SGSN contacts the authentication server (steps P1 and P2), the authentication server may update the current location of the legacy terminal to the rendezvous server.

When a HIP CN resolves the host information for the legacy terminal from the DNS (or some other lookup service), it gets the HI of the legacy terminal and the IP address to the rendezvous server. It then starts the HIP negotiation by sending the I1 packet to that address. The rendezvous server forwards the I1 packet, using the HIT in the packet, towards the correct GGSN.

When the I1 packet arrives at the GGSN to which the legacy terminal is communicating, the GGSN can find the mapping between the persistent HIT and the current temporary identity of the host. It can now respond to the HIP CN with the R1 packet where the certificate bit is set. After this, it sends the CER packet containing the authorization information for signing packets with the temporary private key.

The public key in the R1 packet is the temporary public key, i.e. the temporary HI generated by the visited network. The R1 packet contains the temporary public key because that is the key that the GGSN will use for signing the packets. The HIP header in the R1 packet contains the persistent HIT of the LT. When the GGSN responds with the R1 packet it also sends certificate packet that follows the R1 packet. In this certificate packet the persistent public key is carried and it verifies also that the GGSN has permission to use the temporary identity on behalf of the legacy terminal.

The I2 and R2 packets finalize the HIP negotiation, and an IPsec SA is established between the HIP CN and the current GGSN. The connection setup is done normally over the IPsec tunnel to the HIP proxy in the GGSN which forwards the TCP SYN to the legacy terminal in the visited network.

An embodiment of the present invention allows a straightforward approach for dealing with roaming of the legacy terminal from one network to another. When the legacy terminal moves and changes the network, it may also change the GGSN. If the GGSN changes, the PDP context has to be recreated at the new network. The new PDP context is activated as described above in steps P1 to P8. When the legacy terminal sends the first data packet in the new network (not necessarily a new connection attempt, but any type of packet) the new GGSN performs a reverse lookup procedure for the destination HIT used in the packet. The reverse lookup can be done using e.g., a Distributed Hash Table (DHT) server or similar. When the reverse lookup has been performed successfully, the GGSN is able to send a new I1 packet to the HIP ON and do the base exchange steps P10 to P13 as described above. After the base exchange has completed the HIP ON will drop the old HIP association and set the new association as the new location of the legacy terminal.

The legacy terminal application can continue its tasks uninterrupted as the end-points do not change from its point of view, although there is a new security association between the new GGSN and the HIP CN.

If the first communication, after the legacy terminal has roamed to a network, is from the HIP CN to the legacy terminal (not vice versa as described above), the HIP CN will send the packets to the Forwarding Agent (rendezvous server) of the legacy terminal. If the HLR/AuC has updated the location of the legacy terminal to the Forwarding Agent then the Forwarding Agent will forward the packets to the new GGSN, in which case the new GGSN will reply to the HIP CN that this is an unknown association. When the HIP CN receives this reply, the HIP CN will send a new I1 packet and start the HIP negotiation all over again and the negotiation proceeds as described above.

The use of a persistent HIP identity for the legacy terminal assists greatly in allowing roaming. With temporary HIP identities, the HIP CN host could not verify that the legacy terminal is the same as it was previously under the previous gateway node or GGSN. With an embodiment of the present invention, the roaming scheme makes use of the binding of the temporary identity to the permanent or persistent identity which then verifies to the HIP CN that this legacy terminal is actually the same as earlier, even though it has a new gateway node or GGSN and a new temporary identity. In the previously-considered scheme, the legacy terminal would get a new temporary identity every time the legacy terminal changes the gateway node or GGSN, and also a new temporary identity is generated if the legacy terminal deactivates the PDP context and activates a PDP context again. With an embodiment of the present invention, the legacy terminal has a permanent identity and it is able to roam between networks and can be still be identified as the same entity. As mentioned above, this is the core idea of HIP, which is that identity is not dependent of the geographical location of the node and wherever the node moves the identity remains the same and the node can be identified as the same entity at every geographical and topological location.

It will be appreciated that operation of one or more of the legacy terminal, SGSN, GGSN HIP proxy and HIP host can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

A person skilled in the art will appreciate that embodiments of the present invention are not necessarily limited to any particular protocol or addressing scheme for each of the layers, for example in the transport or network layers, and will function within the HIP framework whatever addressing or transport protocol is used around that framework.

What is claimed is:

1. A method of at least partially securing communications between first and second hosts using the Host Identity Protocol, HIP, where the first host is not HIP enabled and the second host is HIP enabled, the method comprising:
    associating the first host with a persistent HIP identity maintained at a remote server;
    obtaining from the remote server a public part of the persistent HIP identity and a certificate authorizing a gateway node between the first and second hosts to use a temporary HIP identity associated with the first host in a subsequent negotiating step; and
    negotiating a secure HIP connection between the gateway node and the second host using at least part of each of the persistent HIP identity, the temporary HIP identity and the certificate.

2. The method as claimed in claim 1, wherein the obtaining step comprises sending the public part of the temporary HIP identity to the remote server.

3. The method as claimed in claim 2, wherein the obtaining step comprises including the public part of the temporary HIP identity in the certificate.

4. The method as claimed in claim 1 wherein the obtaining step comprises signing the certificate at the remote server using the private key part of the persistent HIP identity.

5. The method as claimed in claim 1, wherein the obtaining step comprises sending the certificate to the gateway node.

6. The method as claimed in claim 1, wherein the public part is the public key part of the persistent HIP identity.

7. The method as claimed in claim 1, wherein the negotiating step comprises sending at least one packet from the gateway node to the second host, the at least one packet being signed using the private key part of the temporary HIP identity.

8. The method as claimed in claim 1, wherein the negotiating step comprises sending the certificate from the gateway node to the second host.

9. The method as claimed in claim 1, wherein the negotiating step comprises sending the public part of the persistent HIP identity from the gateway node to the second host.

10. The method as claimed in claim 9, wherein the public part of the persistent HIP identity is sent in the same packet as the certificate.

11. The method as claimed in claim 1, comprising using the certificate at the second host to verify the right of the gateway node to use the temporary HIP identity during the negotiating step.

12. The method as claimed in claim 11, wherein the public part of the persistent HIP identity and the certificate are used to verify the right of the gateway node.

13. The method as claimed in claim 1, wherein the HIP public identifier part of the persistent HIP identity is included in a HIP header during negotiation of the HIP connection between the gateway and the second host.

14. The method as claimed in claim 1, comprising generating the temporary HIP identity at the gateway node.

15. The method as claimed in claim 1, wherein the remote server communicates with a serving node between the first host and the gateway node during the obtaining step.

16. The method as claimed in claim 15, wherein the obtaining step comprises sending the public part of the temporary HIP identity from the gateway node to the serving node.

17. The method as claimed in claim 15, wherein the serving node is a Serving GPRS Support Node (SGSN).

18. The method as claimed in claim 1, comprising updating information in a HIP rendezvous server relating to the location of the first host.

19. The method as claimed in claim 18, wherein the updating step is performed by the remote server in response to or during the obtaining step.

20. The method as claimed in claim 18, wherein the HIP rendezvous server and the remote server are provided as a single server.

21. The method as claimed in claim 18, wherein the HIP rendezvous server is located in the home network of the first host.

22. The method as claimed in claim 1, wherein the gateway node provides the functionality of a HIP proxy.

23. The method as claimed in claim 1, wherein the gateway node is a Gateway GPRS Support Node (GGSN).

24. The method as claimed in claim 1 wherein the remote server is located in the home network of the first host.

25. The method as claimed in claim 1, wherein the remote server is an authentication server.

26. The method as claimed in claim 1, further comprising, when a new gateway node becomes active between the first and second hosts, using the same persistent HIP identity for the first host as a basis for negotiating a new secure HIP connection between the new gateway node and the second host.

27. The method as claimed in claim 26, comprising using a look-up process at the new gateway node to locate the second host, based on the HIP public identifier for the second host included in a subsequent communication from the first host towards the second host.

28. The method as claimed in claim 26, comprising dropping the previous secure HIP connection.

29. A communications system comprising:
first and second hosts, where the first host is not Host Identity Protocol (HIP) enabled and the second host is HIP enabled; a gateway node between the first and second hosts,
a remote server for maintaining a persistent HIP identity associated with the first host;
wherein the gateway node is configured to obtain from the remote server a public part of the persistent HIP identity and a certificate authorizing the gateway node to use a temporary HIP identity associated with the first host to negotiate a secure HIP connection; and
wherein the gateway node and the second host are configured to negotiate a secure HIP connection between the gateway node and the second host using at least part of each of the persistent HIP identity, the temporary HIP identity and the certificate, thereby at least partially securing communications between the first and second hosts using the Host Identity Protocol.

30. A method, for use by a serving node of a network, of enabling communications between first and second hosts of the network to be at least partially secured using the Host Identity Protocol (HIP) where the first host is not HIP enabled and the second host is HIP enabled, the network including a remote server for maintaining a persistent HIP identity associated with the first host, and the method comprising:
obtaining from the remote server a public part of the persistent HIP identity and a certificate authorizing a gateway node of the network between the first and second hosts to use a temporary HIP identity associated with the first host in a subsequent step to negotiate a secure HIP connection between the gateway node and the second host using at least part of each of the persistent HIP identity, the temporary HIP identity and the certificate.

31. An apparatus, for use as a serving node of a network, for enabling communications between first and second hosts of the network to be at least partially secured using the Host Identity Protocol (HIP) where the first host is not HIP enabled and the second host is HIP enabled, the network including a remote server for maintaining a persistent HIP identity associated with the first host, and wherein the apparatus is configured to obtain from the remote server a public part of the persistent HIP identity and a certificate authorizing the gateway node of the network between the first and second hosts to use a temporary HIP identity associated with the first host in a subsequent process to negotiate a secure HIP connection between the gateway node and the second host using at least part of each of the persistent HIP identity, the temporary HIP identity and the certificate.

32. A method, for use by a gateway node between first and second hosts of a network, of enabling communications between the first and second hosts to be at least partially secured using the Host Identity Protocol (HIP) where the first host is not HIP enabled and the second host is HIP enabled, the network including a remote server for maintaining a persistent HIP identity associated with the first host, and a gateway node, the method comprising:
obtaining from the remote server a public part of the persistent HIP identity and a certificate authorizing the gateway node to use a temporary HIP identity associated with the first host, and
negotiating a secure HIP connection between the gateway node and the second host using at least part of each of the persistent HIP identity, the temporary HIP identity and the certificate.

33. An apparatus, for use as a gateway node between first and second hosts of a network, for enabling communications between the first and second hosts to be at least partially secured using the Host Identity Protocol (HIP) where the first host is not HIP enabled and the second host is HIP enabled, the network including a remote server for maintaining a persistent HIP identity associated with the first host, and a gateway node configured to obtain from the remote server a public part of the persistent HIP identity and a certificate authorizing the apparatus to use a temporary HIP identity associated with the first host, wherein the apparatus is configured to negotiate a secure HIP connection between the apparatus and the second host using at least part of each of the persistent HIP identity, the temporary HIP identity and the certificate.

* * * * *

UNITED STATES PATENT AND TRADEMARK OFFICE
CERTIFICATE OF CORRECTION

PATENT NO. : 8,516,243 B2  
APPLICATION NO. : 11/816459  
DATED : August 20, 2013  
INVENTOR(S) : Jokela et al.

Page 1 of 1

It is certified that error appears in the above-identified patent and that said Letters Patent is hereby corrected as shown below:

On the Title Page, in item (56), under "OTHER PUBLICATIONS", in Column 2, Line 5, delete "Dpartment" and insert -- Department --, therefor.

On the Title Page, in item (56), under "OTHER PUBLICATIONS", in Column 2, Line 7, delete "et al" and insert -- et al. --, therefor.

In the Drawings

In Fig. 8, Sheet 7 of 11, delete "HIP HOST" and insert -- HIP HOST 122 --, therefor.

In the Specifications

In Column 2, Line 16, delete "Architecture"." and insert -- Architecture", --, therefor.

In Column 6, Line 40, delete "security" and insert -- Security --, therefor.

In Column 11, Line 20, delete "given," and insert -- given --, therefor.

In Column 14, Line 5, delete "TG," and insert -- T6, --, therefor.

In Column 16, Line 49, delete "6.3.1)" and insert -- 6.3.1). --, therefor.

In Column 18, Line 51, delete "ON" and insert -- CN --, therefor.

In Column 18, Line 52, delete "ON" and insert -- CN --, therefor.

Signed and Sealed this  
Twentieth Day of May, 2014

Michelle K. Lee  
*Deputy Director of the United States Patent and Trademark Office*